United States Patent [19]

Bekkering

[11] Patent Number: 5,349,817
[45] Date of Patent: Sep. 27, 1994

[54] AIR GAP MANIFOLD PORT FLANGE CONNECTION

[75] Inventor: Mark W. Bekkering, Byron Center, Mich.

[73] Assignee: Benteler Industries, Inc., Grand Rapids, Mich.

[21] Appl. No.: 151,556

[22] Filed: Nov. 12, 1993

[51] Int. Cl.⁵ ............................................. F01N 7/10
[52] U.S. Cl. ........................................ 60/322; 60/323
[58] Field of Search ............................ 60/323, 322, 282

[56] References Cited

U.S. PATENT DOCUMENTS

| | | | |
|---|---|---|---|
| 3,990,856 | 11/1976 | Suzuki | 60/323 |
| 4,031,700 | 6/1977 | Yamazaki | 60/323 |
| 4,106,288 | 8/1978 | Nagaishi | 60/323 |
| 4,151,716 | 5/1979 | Sakurai | 60/323 |

*Primary Examiner*—Douglas Hart
*Attorney, Agent, or Firm*—Price, Heneveld, Cooper, DeWitt & Litton

[57] ABSTRACT

An air gap manifold joint construction of an engine exhaust port flange having a plurality of exhaust port orifices, each with an inner orifice wall, a dual wall manifold having a plurality of runners each including an inner tubular liner and an outer tubular jacket, the inner tubular liner being generally spaced from the outer tubular jacket substantially over the length of the inner tubular liner to form an air gap, the inner tubular liner having an inlet end and the outer tubular jacket having an end adjacent to the inner tubular liner inlet end, said inner tubular liner inlet end having a periphery with an outer diameter substantially the same size as the inner diameter of the outer tubular jacket end and in peripheral engagement therewith, an adapter sleeve having first and second ends, the first end having an outer diameter substantially the same size as the diameter of the inner orifice wall of the exhaust port flange port orifice, and the second end having an outer diameter substantially the same size as the inner diameter of the inner tubular liner inlet end and in peripheral engagement therewith, an inner weld seam joining the adapter sleeve first end to the inner orifice wall, and an outer weld seam joining both the inner tubular liner inlet end and the outer tubular jacket end to the adapter sleeve second end.

6 Claims, 3 Drawing Sheets

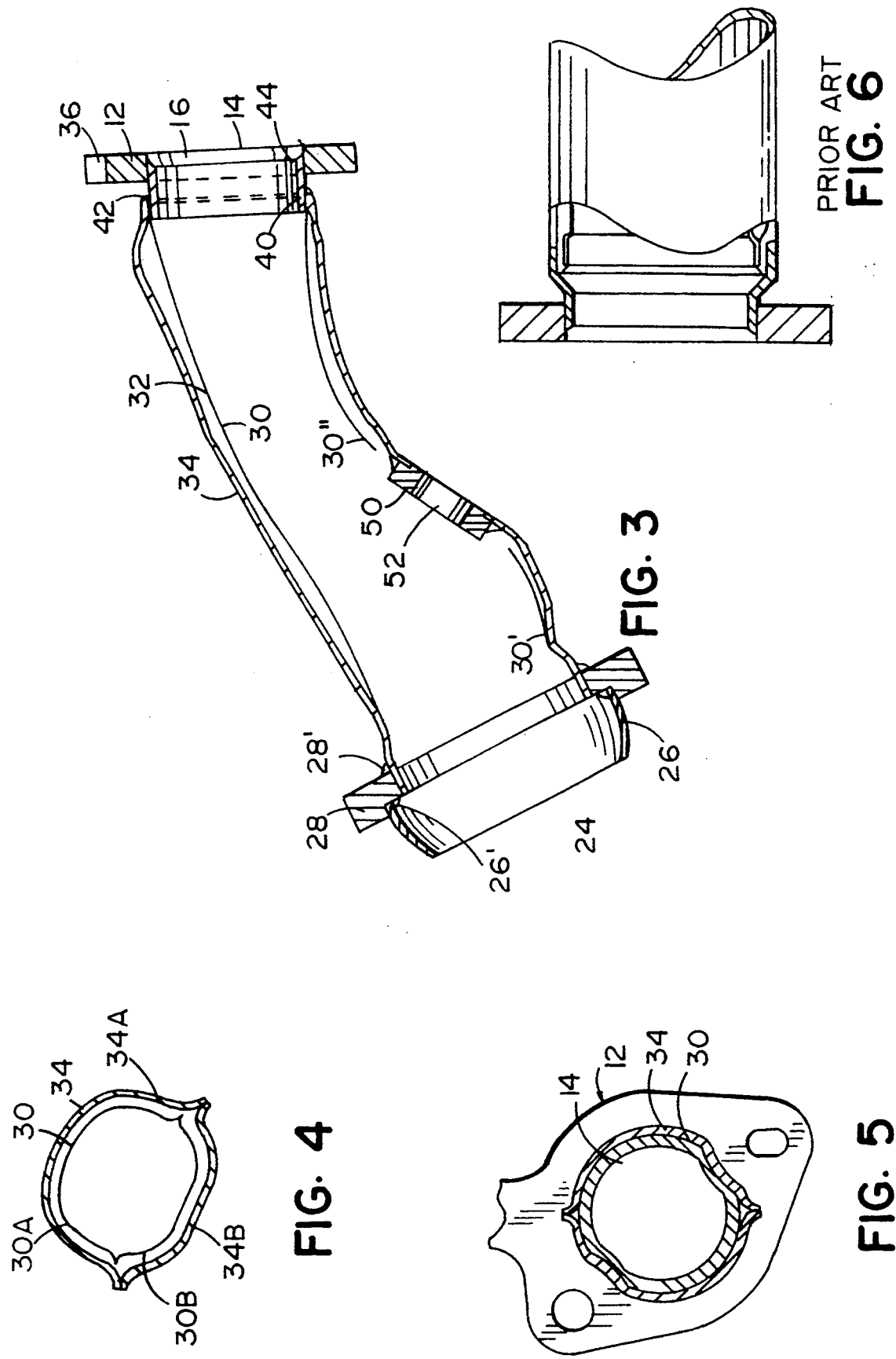

AIR GAP MANIFOLD PORT FLANGE CONNECTION

BACKGROUND OF THE INVENTION

This invention relates to engine exhaust manifold assemblies, and particularly to the attachment of dual wall, air gap manifold runners to the port flange of the manifold.

Exhaust manifolds are formed of what is commonly called a "log," which forms the common gas flow chamber, and a plurality of runners which form the individual flow passages from the engine cylinders to the log. In recent years manifolds have been formed more and more of lightweight, stamped metal such as stainless steel rather than the prior heavy castings that were the standard structure. More recently, air gap manifolds have been devised in order to allow quick internal temperature rise of the manifold, for quick activation of the downstream catalytic converter. Air gap manifolds have an inner tubular liner and an outer tubular jacket generally spaced from each other, to define the air gap between them. The inner liner typically has a thickness less than that of the jacket, enabling even more rapid temperature rise of the liner. The liner and the jacket are often each formed of a clamshell type arrangement. That is, the liner is formed of two half shells secured together along their longitudinal edges, and the larger jacket likewise is formed of two half shells secured together along their longitudinal edges. Connection of the air gap manifold runners to the port flange presently presents a production problem. Specifically, problems arise with attachment of the ends of the jacket and the liner to each other at the port flange, as well as attachment of the jacket and liner to the manifold port flange. At least one manufacturer presently foregoes attachment of the liner to the port flange, leaving the liner to float, but this is not considered advisable. One problem area with attachment of the liner can result because of the potential for burning through the liner during the welding step. Among prior known methods of attachment of these members, an experimental adapter sleeve has been tried by the assignee, by which, with three annular welding seams, the jacket and liner can be secured to each other, the jacket and liner secured to the inside of the adapter sleeve, and the adapter sleeve secured to the port flange as shown in FIG. 6 hereof. However, this technology resulted in problems. Specifically, when TIG welding the liner and the jacket together, burn-through was a significant concern since it results in stress concentration and possible later breakage of the components. Secondly, the connector cup stamped into the adapter sleeve for fitting over and around the liner and jacket ends was often difficult to actually fit onto these liner and jacket ends. Thirdly, making all of these welds effective on each unit was costly and time consuming. Fourthly, any extra filler weld on the outermost weld seam could cause interference with the adjacent bolt socket for the manifold flange. Fifthly, if there was a faulty weld, exhaust gases could enter the air gap with definite negative results. Consequently, this prior experiment was not considered successful.

SUMMARY OF THE INVENTION

The present invention employs only one weld to connect both the jacket and the liner ends to an inner adapter sleeve, and one annular weld seam to connect one end of the adapter sleeve to the inside port wall of the port flange. These two welds are located such as not to interfere with the bolt socket of the port flange. The end of the inner tubular liner extends a small amount beyond the end of the outer tubular jacket, with both of these fitting over, and the liner being in engagement with, the second end of the adapter sleeve. A simple weld extends from the adapter sleeve over the protruding end of the liner, to the end of the jacket, forming a single, annular weld seam. Moreover, even if the weld is faulty in one spot or so, the exhaust gases cannot enter the air gap between the liner and the jacket.

The novel joint enables dual wall clamshells to be radially offset at the port flange to minimize thermal inertia of the manifold. The joint minimizes weld seam and enables use of proven production welding methods. The joint does not infringe upon the bolt socket clearance, restrict exhaust gas flow, or direct exhaust gases into the air gap area at the port flange in the event of a faulty weld burnthrough. The air gap structure can alternatively be manufactured by hydroforming as in U.S. Pat. No. 5,170,557, instead of the clamshell type.

BRIEF DESCRIPTION OF THE DRAWINGS

FIG. 3 is a sectional view taken on plane III—III of FIG. 1;

FIG. 4 is a sectional view taken on plane IV—IV of FIG. 1;

FIG. 5 is a sectional view taken on plane V—V of FIG. 1; and

FIG. 6 is a sectional view of a prior unsuccessful joint.

DESCRIPTION OF THE PREFERRED EMBODIMENT

Figure 1:
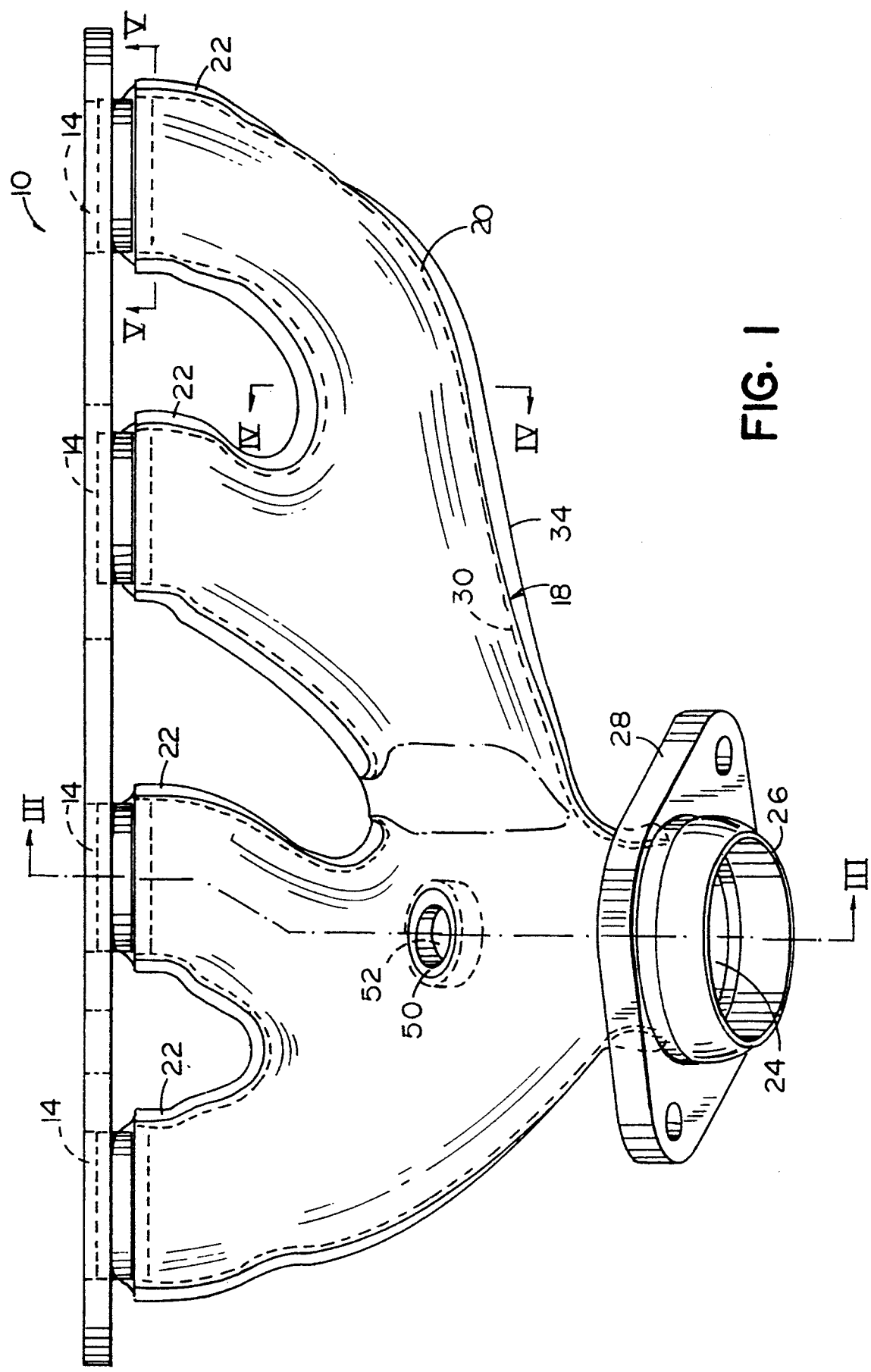
FIG. 1 is a top plan view of an air gap manifold assembly.
Figure 2:
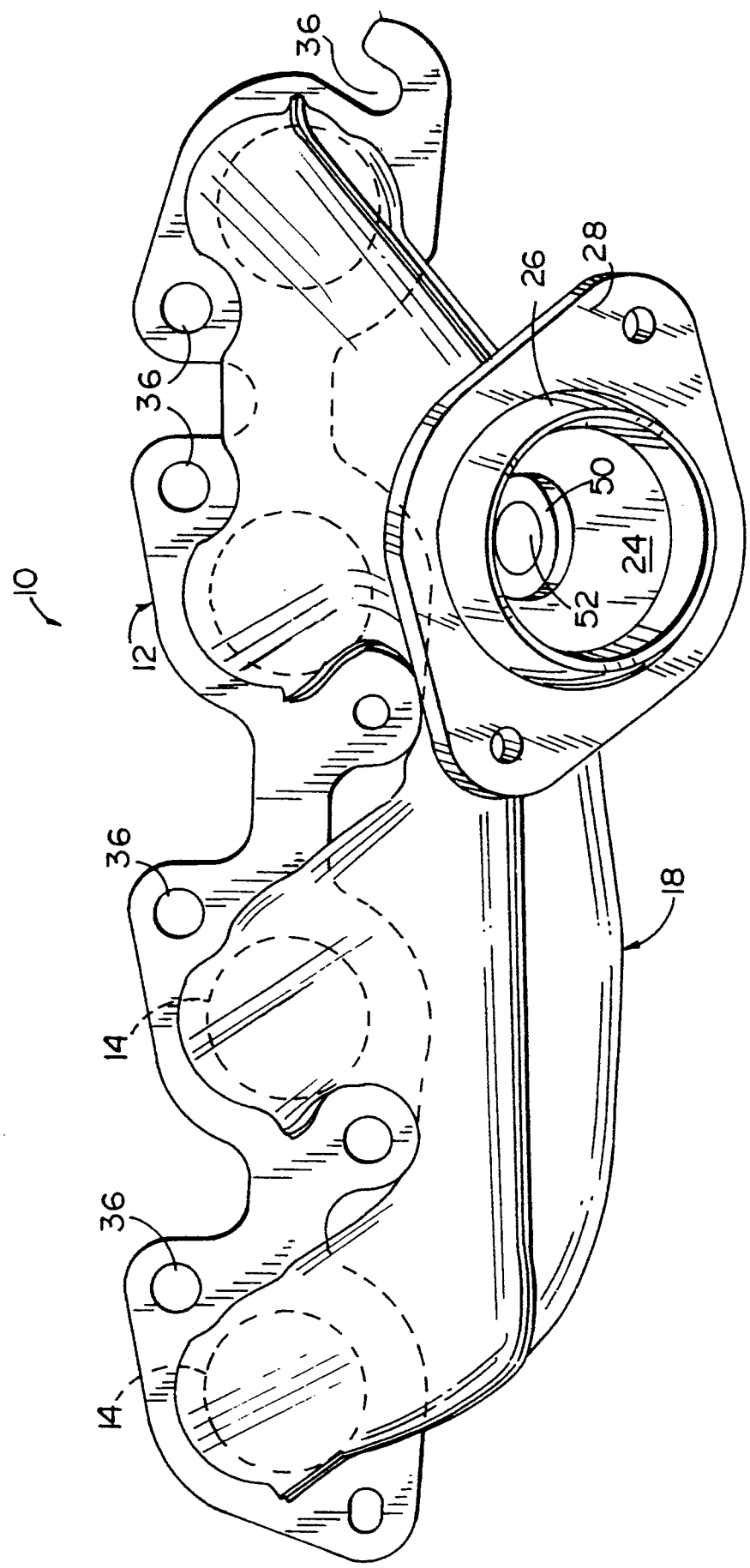
FIG. 2 is an elevational view of the assembly in FIG. 1.

Referring now specifically to the drawings, the air gap manifold assembly 10 there depicted includes an elongated planar exhaust port flange 12 having a plurality, here four, of exhaust port orifices 14 therethrough. The exhaust port flange 12 has bolt openings 36 along its length, preferably two on opposite sides of each exhaust port orifice 14 (FIG. 2) for effective, tight clamping of the manifold to the engine block (not shown). Each exhaust port orifice has an inner orifice wall 16 of generally cylindrical configuration, i.e., circular in cross section. Joined to this exhaust port flange is the manifold body 18 including a portion commonly called a log 20 which defines a common gas flow chamber for the manifold and including a plurality, here four, of runners 22 to be joined to exhaust port flange 12 and which define the individual flow passages from the engine cylinders through the exhaust port flange orifices to the common flow chamber of the log and hence to the remainder of the exhaust system. Body 18 includes a discharge outlet 24 with a curved, annular swivel joint element 26 of selected type therearound. This joint typically will have an annular clamp flange 28 or the equivalent. Clamp flange 28 is shown welded by an exterior annular fillet weld 28' to the downstream end of jacket 34, while swivel joint element 26 is welded to flange 28 by an interior annular fillet weld 26'. Connected to this joint would be an exhaust pipe (not shown) which would normally lead to a catalytic converter (not shown), and ultimately to the muffler and tailpipe (not shown) of the exhaust system. Since the exhaust pipe, catalytic converter, muffler and tailpipe are common components, it is not necessary to illustrate them here.

The manifold 18, i.e., log 20 and runners 22, comprises an air gap manifold formed of an inner tubular liner 30 and an outer tubular jacket 34 defining a space or air gap 32 therebetween. These components typically will be formed of stainless steel or other corrosion resistant material, with liner 30 being considerably thinner than jacket 34, for optimum rapid temperature rise of the liner and minimum thermal inertia characteristics. The outer jacket 34 is shown formed of a clamshell type structure, i.e., the jacket is formed of two elongated half shells 34a and 34b (FIG. 4) joined together along their longitudinal edges as by welding. Likewise, inner liner 30 is shown formed of two elongated half shells 30a and 30b joined together along their longitudinal edges as by welding. The jacket may be, and is shown to be, longer than the liner toward the discharge outlet, so that the second, i.e., outlet, end of the liner terminates short of the outlet in the jacket. The downstream end 30' of liner 30 (FIG. 3) is shown to have an enlarged outer diameter substantially the same as the inner diameter of jacket 34 at this location, to cause this downstream end to peripherally engage the jacket but not be bonded thereto. This engagement prevents any significant amount of gases from flowing into the air gap, but allows longitudinal differential thermal expansion and contraction of the two components to be readily accommodated by a slidable engagement therebetween. As previously noted, the jacket and liner can alternatively be shaped and spaced by hydroforming.

Each of runners 22 is connected to the exhaust port flange at an exhaust port orifice, with a special unique joint connection found to be particularly effective. More specifically, the opening at the inlet end of inner liner 30 for each runner has an outer diameter substantially the same size as the inner diameter of the adjacent end of outer jacket 34 (FIG. 3), to cause these two components to peripherally engage at this location. Further, immediately inside of inner liner 30 is an adapter sleeve 40 which has an outer diameter substantially the same size as the inner diameter of liner 30 at the joint. The end of liner 30 and the end of jacket 34 both extend over the outer periphery of the first end of sleeve 40, the liner end being in peripheral engagement with sleeve 40 and the jacket end being in peripheral engagement with the liner end. The liner inlet end outer diameter is substantially the same as the jacket end inner diameter, with the end of liner 30 extending a small amount, e.g., several millimeters, axially over sleeve 40 beyond the end of outer jacket 34. The outer diameter of sleeve 40 is substantially the same as the inner diameter of the inlet end of liner 30. A fillet weld annular seam 42 extends around these components and extends axially from the end of outer jacket 34 over the surface of inner liner 30 to the outer surface of sleeve 40 so that this one weld seam bonds all three of these components together. In practice, the exposed end of liner 30 typically fuses into the weld. A second annular weld seam 44 bonds the inner second end of sleeve 40 to the inner orifice wall 16 of exhaust port flange 12. The novel joint thus enables dual wall clamshells to be radially offset at the port flange to minimize thermal inertia of the manifold. The joint minimizes weld seam and enables use of proven standard production welding methods. The joint does not infringe upon the bolt socket clearance 36. It further does not restrict exhaust gas flow. Also, even if there is a faulty weld at 42, the exhaust gases will not be directed into the air gap area between liner 30 and jacket 34.

If it is desired to provide for installation of a gas sensor, typically an electronic gas sensor of known type (not shown), in order to analyze exhaust gases for combustion efficiency determination, an annular, drilled and tapped boss 50 can be welded to the inside wall of jacket 34. Boss 50 has a threaded opening 52 to receive the sensor (not shown). Liner 30 is provided with an opening 30" around the boss and spaced a small amount, e.g., about 8 mm, therefrom. The resulting small gap is not significantly deleterious to the manifold operation because any small amount of exhaust gases entering air gap 32 at this zone is relatively stagnant.

These above listed advantages and features of the invention will become apparent to those in the art upon studying this disclosure. It is conceivable that certain details of this structure could be modified to accommodate particular engine types, sizes or arrangements, within the concept presented. Hence, the invention is not intended to be limited specifically to the preferred embodiment depicted as illustrative, but only by the scope of the appended claims and the reasonably equivalent structures to those defined therein.

The embodiments of the invention in which an exclusive property or privilege is claimed are defined as follows:

1. Air gap manifold joint construction comprising:
    an engine exhaust port flange having a plurality of exhaust port orifices, each with an inner orifice wall;
    a dual wall manifold having a plurality of runners, each including an inner tubular liner and an outer tubular jacket;
    said inner tubular liner being generally spaced from said outer tubular jacket substantially over the length of said inner tubular liner to form an air gap;
    said inner tubular liner having an inlet end and said outer tubular jacket having an end adjacent to said inner tubular liner inlet end;
    said inner tubular liner inlet end having an outer diameter substantially the same size as the inner diameter of said outer tubular jacket end and in peripheral engagement therewith;
    an adapter sleeve having first and second ends;
    said adapter sleeve first end having an outer diameter substantially the same size as the diameter of said inner orifice wall of said exhaust port orifice;
    said adapter sleeve second end having an outer diameter substantially the same size as the inner diameter of said inner tubular liner inlet end and in peripheral engagement therewith;
    an inner weld seam joining said adapter sleeve first end to said inner orifice wall; and
    an outer weld seam joining said inner tubular liner inlet end and said outer tubular jacket end to said adapter sleeve second end.

2. The air gap manifold joint construction in claim 1 wherein said inner tubular liner inlet end and said outer tubular jacket end both extend over said adapter sleeve second end.

3. The air gap manifold joint construction in claim 2 wherein said inner tubular line inlet end projects over said adapter sleeve second end a small amount beyond said outer tubular jacket end, with said outer weld seam extending over said small amount from said outer tubular jacket end to said adapter sleeve.

4. The air gap manifold joint construction in claim 3 wherein said outer weld seam extends as one solid annular seam from said adapter sleeve second end, over said inner tubular liner end, to said outer tubular jacket end.

5. The air gap manifold joint construction in claim 1 wherein said inner tubular liner has a second end, said outer tubular jacket has an outlet end, and said inner tubular liner second end terminates short of said jacket outlet end.

6. The air gap manifold joint construction in claim 5 wherein said inner tubular liner second end is in slidable engagement with said outer tubular jacket.

* * * * *